H. CONBOY.
COMBINED BACK REST, LUGGAGE CARRIER, AND HANDLE BAR.
APPLICATION FILED MAR. 28, 1911.
1,033,156.
Patented July 23, 1912.
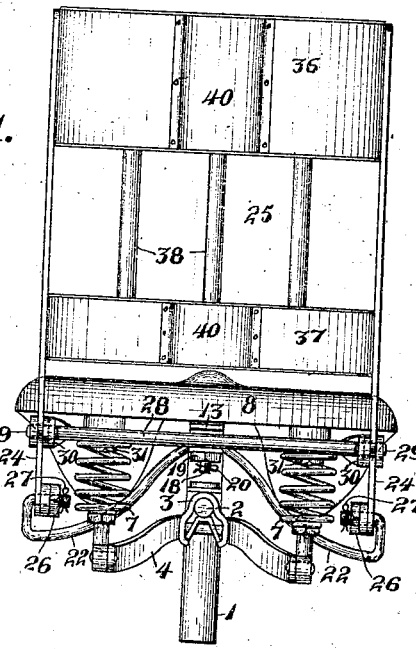
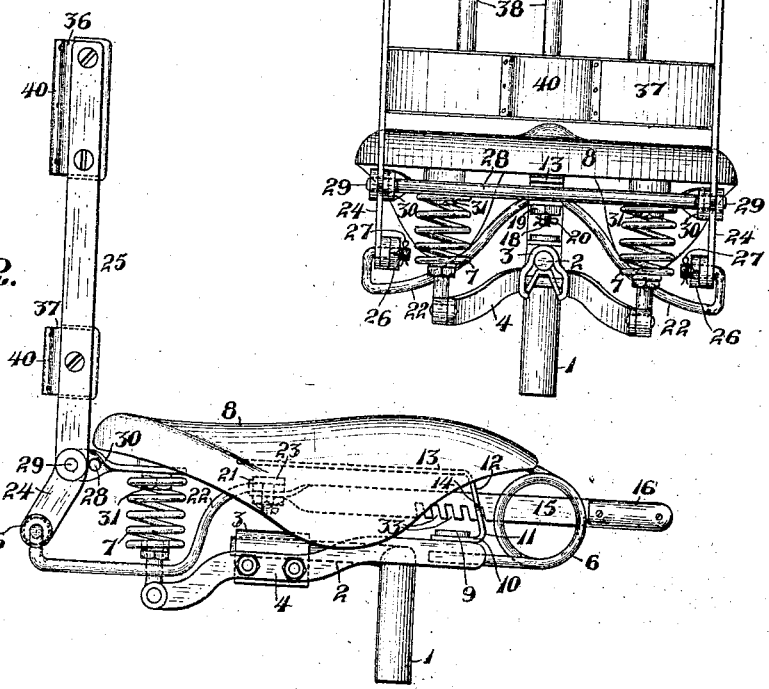
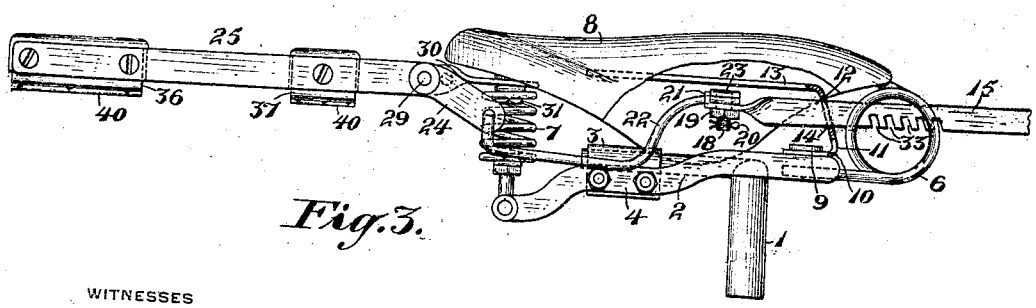
WITNESSES
INVENTOR
Henry Conboy
By
Fm. Wright
Attorney

UNITED STATES PATENT OFFICE.

HENRY CONBOY, OF ALAMEDA, CALIFORNIA.

COMBINED BACK-REST, LUGGAGE-CARRIER, AND HANDLE-BAR.

1,033,156.      Specification of Letters Patent.      Patented July 23, 1912.

Application filed March 28, 1911. Serial No. 617,492.

*To all whom it may concern:*

Be it known that I, HENRY CONBOY, a citizen of the United States, residing at Alameda, in the county of Alameda and State of California, have invented new and useful Improvements in Combined Back-Rests, Luggage-Carriers, and Handle-Bars, of which the following is a specification.

The object of the present invention is to provide a combination back rest, luggage carrier, and a handle bar for tandem riding, which can be attached to and detached from a saddle of a motor or other cycle.

In the accompanying drawing, Figure 1 is a rear view of the device; Fig. 2 is a side view, showing the back rest in an elevated position; Fig. 3 is a broken similar view, showing the back rest in a lowered position.

The drawing shows one of numerous forms of cycle saddles to which my invention may be applied. However, slight changes may be employed, without departing from the spirit of my invention to adapt it to be used with various forms of saddles.

Referring to the drawing, 1 indicates a post, which is fitted in the usual socket or tube provided in the cycle or motor cycle. Said post is formed with a goose neck 2 secured, as shown at 3, to the frame 4 of the saddle, said frame supporting, by means of springs 6 and 7, the seat 8, all of the above being a well-known construction.

To the bolt 9, which connects the frame with the springs 6, is secured the lower member 10 of a flat steel bar 11, bent so as to have said lower member 10, an intermediate upwardly extending member 12, and a horizontal rearwardly extending member 13. In said member 12 is formed a vertical slot 14, through which extends a slide bar 15, which is formed of flat sheet metal. It is provided with a handle 16, preferably of wood, connected thereto by screws. In taking the back rest apart from the saddle the handle is removed from the slide bar. The forward portion of said slide bar is in a vertical plane and passes between the two front springs 6 of the frame, and its rear portion is turned through a right angle into a horizontal plane. In said rear end is formed a hole, through which is passed a bolt 18 upon which is a nut 19, a split pin 20 being passed through the hole in the lower end of the bolt. The rear end of said slide bar is formed also with upwardly projecting terminal fork members 21, between which extends the central portion of a round bar 22 of cold rolled steel, bent at the middle, so that the parts on each side of the bend are brought close together and pass between the forked members 21. The bolt 18 passes through the central loop, thus formed, of said bar 22, and surrounding said central portion of the bar is an apertured yoke 23 through which also passes said bolt 18. By screwing said nut 19 tightly upon said bolt, the central portion of the round bar is firmly held in place.

The bar 11 is extended rearwardly as shown at 13, from the slotted portion 12, in order to furnish a protector for the saddle, should the nut 19 become loose, for in that case the connection between the rods 22 and 14 would be a loose connection permitting the head 23 of the bolt 18 to move upwardly. By extending the bar 11 rearwardly the said head 23 does not strike the under side of the saddle in case of such upward movement.

The side members of the bar 22 are curved to pass around the springs 7 of the saddle, and at the rear terminal portions are bent upwardly and then inwardly, or toward one another, and are threaded on their ends, and pass through holes formed in the lower ends of the side frame pieces 24 of a back rest 25. Said lower ends are suitably thickened or enlarged to provide wide bearings for said terminal portions of said bar. Upon the threaded ends of the bar are screwed nuts 26, and split pins 27 are passed through holes in the bar to maintain the nuts in position.

The side members 24 of the frame of the back rest are pivoted at 29 to arms 30, the front ends of which are connected to the bolts 31, which are used in the saddle to connect the springs 7 to the frame of the saddle. Thus the pivotal support of the back-rest is connected with the saddle above the springs for resiliently supporting the saddle. Consequently the back-rest vibrates with the saddle, thus avoiding the discomfort which would be occasioned to the rider if the back-rest were connected to the saddle support, in which case in the vibratory motion of the saddle, the back-rest would be reciprocating vertically in contact with the back of the rider. These arms 30 are also connected to each other by a cross bar 28. The lower portions of the side members below the arms 30 extend slightly in a rearward direction relatively to the upper portions thereof.

From the above description it will appear that by sliding the slide bar in a forward or rearward direction, the lower ends of the back-rest frame can be correspondingly moved in a forward or rearward direction, and the back rest can thus be moved to a horizontal position as shown in Fig. 3 or to vertical position as shown in Fig. 2. I provide means whereby said back rest may be maintained in either of these positions or in intermediate positions between the vertical and horizontal. The connection of the lower portion of the back-rest by means of a bar 22, attached at its ends to the sides of the back-rest, and the middle portion of which is attached to the slide bar 15, provides an arrangement by which the device can be operated by the rider with a single hand, while at the same time movement is imparted equally thereby to both sides of the back rest. The means for maintaining it in the vertical or intermediate position consists of notches 33 formed in the lower edge of the slide bar. Any one of the notches is adapted to engage the lower end of the slot 14 formed in the vertical portion 12 of the support. These notches 33 extend upwardly and rearwardly, conforming to the direction of the intermediate portion 12 of the bar. From this arrangement it results that the pressure of the rider against the back-rest tends to hold said notched portion of the bar 15 more firmly against the bar 11, and thus to maintain the engagement of the notch 14 with the bar 11. To move a back rest from one position to another the front end of the slide bar is lifted, so that the lower ends of said notches can clear the lower end of the slot. The slide bar is then moved in a longitudinal direction and is dropped, so that the proper notch may engage the support at the bottom of the slot 14. Said notches have a slightly oblique inclination relative to the lower edge of the slide bar, and are, in fact, parallel with the intermediate portion 12 of the support. These various positions of the back rest are intended to accommodate the device for the various angles of inclination at which riders use the saddle. When the slide bar is drawn fully forward, the back rest, then extends in a horizontal direction and may then be used as a luggage carrier. The rear portion of said slide bar is formed without notches so that, when used as a luggage carrier, it can be used with either a high or a low rear wheel. Said back rest comprises, in addition to said side frames 24, upper and lower cross pieces 36, 37, suitably cushioned at the front sides, as shown, and connected, if desired, by vertical members 38.

To prevent the enamel on the mud guard being scratched by the back rest when used as a luggage carrier the rear portions of the upper and lower cross members 36, 37, may be provided, as shown at 40, with any suitable yielding or resilient material.

The back rest is only slightly concaved in a horizontal direction and its curvature is not so great as the transverse curvature of the back of an ordinary rider, so that, when used as a back rest, the two side bars 24 can be held by the hands of the rider on a rear seat, riding tandem, and thus displace the handle bars ordinarily used for this purpose. By reason of the bar 11 being flat, the seat can come in contact with the upper side of said bar, as when supporting a heavy rider, without the bar cutting into the seat or injuring the rider, and also by reason of this bar the rider is protected in case of breakage of any of the parts of the frame of the saddle or back rest.

I claim:—

1. In combination with a saddle, a back-rest comprising two parallel side pieces, a rod, the ends of which are pivotally attached to the lower ends of said side pieces, and slide bar, the rear end of which is connected to the middle portion of said rod, said slide bar being provided with means for variously securing it in a position of rest, and the front end of said slide bar being provided with means for moving it forwardly or rearwardly.

2. In combination with a saddle and a frame therefor, a flat bar attached to the frame of the saddle and bent so as to have the upper portion horizontal and having a slotted intermediate portion, a back rest pivoted to the rear of said horizontal portion, and a device pivoted at the rear to the back rest and extending beneath the saddle, the front portion of the device passing through said slot and having notches for engaging the bottom of the slot, substantially as described.

3. In combination with a saddle and a frame therefor, a bar attached to the frame of the saddle and having a slotted portion, a back rest pivoted to the rear of the saddle, and a device comprising a rear bar bent in the middle, the ends thereof being pivotally connected to the respective sides of the back rest, and a front flat bar connected to the middle of the rear bar and having a plurality of notches in its lower edge, substantially as described.

In testimony whereof I have hereunto set my hand in the presence of two subscribing witnesses.

HENRY CONBOY.

Witnesses:
F. M. WRIGHT,
D. B. RICHARDS.